United States Patent Office 2,920,070
Patented Jan. 5, 1960

2,920,070

METALLISABLE AZO DYESTUFFS AND METALLIFEROUS COMPLEXES DERIVED THEREFROM

Marcel Jirou, Sotteville-les-Rouen, and Jean-Marie Frey, Les Authieux sur le Port St.-Ouen, Oissel, France, assignors to Compagnie Française des Matières Colorantes, Paris, France, a French company No Drawing. Application December 13, 1957
Serial No. 702,498

Claims priority, application France December 14, 1956

3 Claims. (Cl. 260—147)

The present invention relates to new metallisable azo dyestuffs and metalliferous complexes derived therefrom.

According to the present invention metallisable monoazo dyestuffs are provided of the general formula:

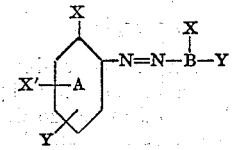

(I)

in which B represents the residue of a coupling component, X represents a group capable of taking part in the formation of a metalliferous complex, X' represents a hydrogen atom or any non-ionic group, one Y represents a hydrogen atom, and the other a ureosulphonyl group of the formula

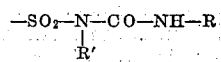

in which R represents a hydrogen atom or an alkyl, cycloalkyl, aryl or aralkyl group, and R' represents a hydrogen atom or an alkyl or aryl group.

Among the dyestuffs of general Formula I, those are particularly interesting in which the benzene nucleus A is substituted by the ureosulphonyl group defined above. They can be prepared by coupling the diazo derivative of an amine of the general formula:

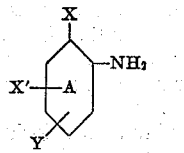

(II)

with a compound of formula X—BH$_2$, in which formulae the symbols B, X, X' and Y have the same signficance as above. The amines of general Formula II are described and claimed in the patent application Serial No. 702,497 of even date by the applicants for "New Aromatic Amines and Processes for Their Preparation."

The dyestuffs of general Formula I, in which the residue B of the coupling compound is substituted by the ureosulphonyl group defined above, may be prepared by coupling the diazo derivative of an amine of formula

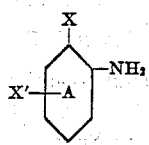

with the compound of formula X—BH—Y, the symbols B, X, X' and Y having the same significance as above.

As examples of the metallisable groups present on the benzene nucleus A of the amines used there may be mentioned, in particular, the groups —OH, —COOH, —OCH$_3$, —O—CH$_2$—COOH or —S—CH$_2$—COOH, and where the coupling component is concerned, the groups —OH and —NH$_2$.

Such components may be, for example, acetylacetic esters; the anilides derived therefrom, which may be substituted on the benzene nucleus by one or more substituents such as halogen atoms or methyl, methoxy, sulphonamido or ureosulphonyl groups; 3-methyl-5-pyrazolone, N-alkyl- or N-aryl-3-methyl-5-pyrazolones which may be substituted by one or more substituents such as halogen atoms or alkyl, nitro, sulphonamido or ureosulphonyl groups; amides of 1-phenyl-3-carboxy-5-pyrazolone possibly substituted on the nitrogen atom, the phenyl radical being able to carry one or more of the aforesaid substituents; barbituric acid which may be substituted by alkyl or aryl groups; 3-hydroxy-thionaphthene; 6-hydroxy-indazole and its nitro derivatives; 3-hydroxy-diphenylene oxide; homophthalimide; phenol and its derivatives substituted by halogen atoms or nitro, alkyl, acylamino or alkylamino groups; resorcinol and its esters; 3-hydroxy-diphenylamine and its derivatives substituted by halogen atoms or nitro or alkyl groups; 1-hydroxy- or 2-hydroxy-naphthalenes which may be substituted by one or more substituents such as halogen atoms or methoxy, ethoxy, sulphonamido, ureosulphonyl or nitro groups; the N-alkyl-, N-acyl- or N-alkylsulphonyl-aminonaphthols; the N-hydroxynaphthylureas and thioureas; the N-hydroxynaphthyl-N'-alkyl- or N'-acyl-ureas and thioureas; 1- or 2-naphthylamines, simple or monosubstituted on the nitrogen and possibly carrying one or more halogen atoms or sulphonamido or ureosulphonyl groups; 2:4-dihydroxyquinoline and its N-substituted derivatives; the arylamides or alkylamides of β-hydroxynaphthoic acid.

The conversion of the monoazo dyestuffs thus prepared into metalliferous dyestuffs may be effected by any generally known method of metallising. In particular, it can be effected by metallising treatments which lead to metalliferous complexes containing less than one atom of complexing metal per molecules of monoazo dyestuff. All the methods leading to complexes corresponding to this last constitution can be used, and amongst these must be included those which employ chroming in the presence of amides or ammonium salts of carboxylic acids, aromatic ortho-hydroxycarboxylic acids, aliphatic hydroxycarboxylic acids, and aminocarboxylic acids; heating the alkali metal salts of aliphatic monocarboxylic acids containing water of crystallisation in the presence of a metallising agent; chroming in the presence of organic solvents; heating in aqueous solution in the presence of a salt of cobalt, nickel, copper, iron, manganese or aluminium and in the presence of excess of caustic soda, possibly in the presence of an aliphatic hydroxycarboxylic acid; the reaction of the unmetallised dyestuff with a metallising agent in the presence of another metallisable dyestuff of such nature that the complex obtained contains one atom of metal to two molecules of dyestuff; the reaction of the unmetallised dyestuff with a metalliferous dyestuff containing one atom of metal per molecule of dyestuff.

The metalliferous dyestuffs of the present invention are suitable for dyeing wool, natural silk, leather, animalised cellulosic fibres, superpolyamides and superpolyurethanes in a weakly acid, neutral or weakly alkaline bath, while cotton and cellulose acetate are excepted. They are also suitable for the coloration of organic solvents, lacquers, varnishes and bulk materials based on cellulose esters or ethers. These dyestuffs have the advantage of very great solubility while giving shades endowed with good general fastness.

The invention will be more clearly understood by reference to the following examples which are purely illustrative and in which the parts are by weight, except when the contrary is indicated.

*Example 1*

25.9 parts of N-(3-amino-4-hydroxy-phenylsulphonyl)-N'-ethylurea are dissolved at 50° C. in 200 parts of water, mixed with 13.8 parts of concentrated hydrochloric acid and diazotised at a temperature between 0° C. and 5° C. by adding 6.9 parts of sodium nitrite. The excess of nitrite is removed by the addition of a little sulphamic acid and the excess of acid by the addition of sodium carbonate. The diazo derivative is then poured into a solution of 22 parts of 1-(4'-chlorophenyl)-3-methyl-5-pyrazolone, 10.5 parts by volume of 10 N caustic soda and 6 parts of sodium carbonate in 150 parts of water. When coupling is finished, the dyestuff is drained at a temperature of 20° C. In order to effect its metallisation, the paste obtained is dissolved in 400 parts of water at 60° C. and 30 parts by volume of 10 N caustic soda, then 88 parts of a solution of cobalt sulphate, corresponding to 3.25 parts of cobalt, are rapidly added and the mixture is kept at 50° C. until the formation of the cobalt complex is completed. The metallised dyestuff is separated by salting out and filtering. When dried, the dyestuff appears as a brown yellow powder; it dyes wool from a neutral or weakly acid bath a yellow shade which is very fast to wet tests and to light.

*Example 2*

25.9 parts of N-(3-amino-4-hydroxy-phenylsulphonyl)-N'-ethylurea are diazotised by the process described in Example 1. The diazo derivative obtained is poured at a temperature between 0° C. and 5° C. into a solution of 22.2 parts of N-acetoacetyl o-chloraniline, 12 parts by volume of 10 N caustic soda and 6 parts of sodium carbonate in 200 parts of water. Stirring is carried out until the end of the coupling process, the temperature being kept between 0° C. and 5° C., then 100 parts of sodium chloride are added, and the mixture is heated to 90° C. and the product drained at 20° C. The dyestuff obtained is dissolved in 200 parts of water mixed with 27 parts by volume of 10 N caustic soda; the solution is treated at 60° C. with 82 parts of a solution of cobalt sulphate, corresponding to 3 parts of cobalt. The cobaltiferous dyestuff formed is isolated by salting out and filtration. When dried, this dyestuff appears as a yellow powder; it dyes wool from a neutral or weakly acid bath a yellow shade having very good general fastness.

*Example 3*

14.4 parts of 4-chloro-2-aminophenol are dissolved in 300 parts of water mixed with 13.8 parts of hydrochloric acid, and diazotised by adding 6.9 parts of sodium nitrite. After removal of the excess nitrite by addition of sulphamic acid, the solution of the diazo derivative is poured at a temperature between 0° C. and 5° C. into a solution of 34 parts of 1-(3'-ethylurea-N'-sulphonyl-phenyl)-3-methyl-5-pyrazolone in 300 parts of water mixed with 21 parts of 10 N caustic soda and 6 parts of sodium carbonate. When the coupling process is finished, the dyestuff formed is drained at a temperature of 20° C. and the paste obtained is dissolved in a mixture of 400 parts of water at 70° C. and 20 parts by volume of 10 N soda. 88 parts of a solution of cobalt sulphate, corresponding to 3.25 parts of cobalt, are added rapidly and the temperature is kept at 70° C. for 45 minutes. The metalliferous dyestuff is isolated by salting out and slight lowering of the alkalinity of the medium by addition of acetic acid, and is then drained and dried. It appears as an ochre-coloured powder and dyes wool from a neutral or weakly acid bath an orange yellow shade having good fastness.

*Example 4*

25.9 parts of N-(3-amino-4-hydroxy-phenylsulphonyl)-N'-ethylurea are diazotised by the process described in Example 1, and the diazo derivative obtained is poured into a coupling bath comprising 23.4 parts of 6-bromo-2-naphthol, 13 parts by volume of 10 N caustic soda, 300 parts of water and 6 parts of sodium carbonate. When coupling is finished, the alkalinity of the reaction medium is slightly reduced, and the dyestuff precipitates. The paste obtained is drained and dissolved at 60° C. in 300 parts of water mixed with 22 parts by volume of 10 N caustic soda; the solution is treated for 30 minutes at 60° C. with 82 parts of a solution of cobalt sulphate, corresponding to 3 parts of cobalt. The metallised dyestuff is precipitated by salting out, and it is drained and dried. It is in the form of a violet powder; it dyes wool from a neutral or weakly acid bath a Bordeaux shade endowed with great general fastness.

*Example 5*

27.3 parts of N-(3-hydroxy-4-amino-6-methyl-phenylsulphonyl)-N'-ethylurea are diazotised by the process described in Example 1, and the diazo derivative obtained is poured at a temperature between 0° C. and 5° C. into a bath of coupling component the same as that in Example 1. When the coupling process is finished, the product is heated to 80° C., 80 parts of sodium chloride are added, and the paste obtained is then drained at 20° C.; it is dissolved in 400 parts of water at 90° C. mixed with 4 parts by volume of 10 N caustic soda. 140 parts of a solution of sodium chromotartrate, corresponding to 2.85 parts of chromium, are then added and the mixture is heated at boiling point for 4 hours. The hot solution is treated wth 100 parts of sodium chloride, and the dyestuff obtained is drained at 20° C. When dried, it is in the form of a reddish powder; it dyes wool from a neutral or weakly acid bath a bluish red shade, which is very fast to wet tests and to light.

*Example 6*

27.3 parts of N-(3-hydroxy-4-amino-6-methyl-phenylsulphonyl)-N'-ethylurea are diazotised by the process described in Example 1, and the diazo derivative obtained is poured at a temperature between 0° C. and 5° C. into a bath of coupling component the same as that in Example 4. At the end of 2 to 3 hours, the coupling process is finished. 20 parts of sodium chloride are then added and the precipitated dyestuff is drained. The violet paste obtained is dissolved in 400 parts of water at 70° C. mixed with 20 parts by volume of 10 N caustic soda. The solution obtained is treated with 82 parts of a solution of cobalt sulphate, corresponding to 3 parts of cobalt. The mixture is heated for 30 minutes at 50° C., 120 parts of sodium chloride are added, and the metallised dyestuff obtained is drained at 20° C. When dried, it is a Bordeaux red powder in appearance and dyes wool from a neutral or weakly acid bath a bright violet shade, which is very fast to wet tests and to light.

*Example 7*

25.9 parts of N-(3-amino-4-hydroxy-phenylsulphonyl)-N'-ethylurea are diazotised by the process described in Example 1, and the solution of the diazo derivative obtained is poured at a temperature between 0° C. and 5° C. into a solution of 22.7 parts of 7-hydroxy-1-naphthyl-methyl carbamate, 13 parts by volume of 10 N caustic soda, and 5 parts of sodium carbonate in 150 parts of water. When the coupling process is finished, 60 parts of sodium chloride are added and the dyestuff formed is drained. It dyes wool from an acid bath a Bordeaux shade, which changes colour on a subsequent chroming on the fibre to a bluish grey endowed with good fastness. This dyestuff is also applicable to the process of dyeing with chroming in a single bath.

The dyestuff paste previously obtained is dissolved in a mixture of 400 parts of water at 80° C. and 1.5 parts by volume of 10 N caustic soda. 132 parts of a solution of sodium chromosalicylate, corresponding to 2.90 parts of chromium, are added and the mixture is refluxed for an hour. The dystuff is precipitated by the addition of 200 parts of sodium chloride and drained at 20° C. When dried, it is in the form of a black powder, dyeing wool from a neutral or weakly acid bath a bluish grey shade, which has great fastness to wet tests and to light.

*Example 8*

A mixture of 22 parts of the unmetallised dyestuff obtained by coupling the diazo derivative of N-(3-amino-4-hydroxy-phenylsulphonyl)-N'-ethylurea with 1-(4'-chlorophenyl)-3-methyl-5-pyrazolone and 30 parts of the unmetallised dyestuff obtained by coupling the diazo derivative of N-(3-amino-4 - hydroxy - phenylsulphonyl) - N'-ethylurea with 1-acetyl-amino-7-naphthol is dissolved in 350 parts of water mixed with 26 parts by volume of 10 N caustic soda. The mixture is heated to 70° C. and 82 parts of a solution of cobalt sulphate, corresponding to 3 parts of cobalt, are added. Heating at 70° C. is continued for 30 minutes, 100 parts of sodium chloride are added and the metalliferous dyestuff formed is drained at 20° C. When dried, it has the appearance of a deep brown powder; it dyes wool from a neutral or weakly acid bath a red-brown shade endowed with very good general fastness.

*Example 9*

10 parts of chromium formiate are dissolved in 200 parts of formamide and a mixture of 24 parts of the unmetallised dyestuff obtained by coupling the diazo derivative of N-(3-amino - 4 - hydroxy - phenylsulphonyl)-N'-ethylurea 1-(4'-chlorophenyl)-3-methyl-5-pyrazolone and 20 parts of the unmetallised dyestuff obtained by coupling the diazo derivative of 4-nitro-2-aminophenol with 1-ureido-7-naphthol is introduced at a temperature of 110° C. The heating is kept at 110° C. for 2 hours, 600 parts of 10% brine are added, and the dyestuff obtained is drained. The paste is taken up in 600 parts of water mixed with 14 parts by volume of caustic soda. The mixture is stirred for 30 minutes, 60 parts of sodium chloride are added and the precipitated dyestuff is filtered off. When dried, it is a black powder in appearance; it dyes wool from a neutral or weakly acid bath a greenish-brown shade having very good general fastness.

*Example 10*

A mixture of 56 parts of the unmetallised dyestuff obtained by coupling the diazo derivative of N-(3-amino-4-hydroxy-phenylsulphonyl)-N'-ethylurea with 7-hydroxy-1-naphthyl methyl carbamate and 23 parts of the unmetallised dyestuff obtained by coupling the diazo derivative of 4-nitro-2-aminophenol with 1-(3'-sulphonamidophenyl)-3-methyl-5-pyrazolone is dissolved in 1500 parts of water admixed with 18 parts of 10 N caustic soda. The mixture is heated to 90–100° C. and 198 parts of a solution of sodium chromosalicylate, containing 21.66 grams of chromium per litre, are added. When the chroming is finished, 200 parts of sodium chloride are added and the precipitated dyestuff is drained at 20° C. After drying, it appears as a deep brown powder; it dyes wool from a neutral or weakly acid bath a brownish grey shade, having excellent general fastness.

In the table below, other metalliferous complexes are mentioned which are capable of being obtained by the methods previously described in Examples 1 to 7. The shades are those obtained on wool from a neutral or weakly acid bath.

|    | Diazotised amine | Coupling component | Complexing metal | Shade on wool |
|----|---|---|---|---|
| 11 | N-(3-amino-4-hydroxy-phenylsulphonyl)-N'-ethylurea. | 1-(3-chloro-phenyl)-3-methyl-5-pyrazolone. | Co | orange-yellow. |
| 12 | ----do---- | ----do---- | Cr | orange. |
| 13 | ----do---- | 1-(2':5'-dichloro-phenyl)-3-methyl-5-pyrazolone. | Cr | Do. |
| 14 | N-(3-amino-4-hydroxy-phenyl-sulphonyl)-N'-phenylurea. | 1-(2'-chloro-phenyl)-3-methyl-5-pyrazolone. | Cr | Do. |
| 15 | N-(3-amino-4-hydroxy-phenyl-sulphonyl)-N'-ethylurea. | 2:4-dihydroxy-quinoline. | Co | Do. |
| 16 | ----do---- | 2:6-dimethyl-N-aceto-acetyl-aniline. | Co | yellow. |
| 17 | N-(3-amino-4-hydroxy-phenyl-sulphonyl)-N'-phenylurea. | 3-sulphonamido-N-aceto-acetyl-aniline. | Co | Do. |
| 18 | N-(3-amino-4-hydroxy-phenyl-sulphonyl)-N'-ethylurea. | 2-hydroxynaphthalene. | Co | Bordeaux. |
| 19 | ----do---- | ----do---- | Cr | violet. |
| 20 | ----do---- | 3-hydroxy-diphenylamine. | Co | Bordeaux. |
| 21 | ----do---- | ----do---- | Cr | brownish Bordeaux. |
| 22 | ----do---- | 3-hydroxy-thionaphthene. | Co | violet Bordeaux. |
| 23 | ----do---- | ----do---- | Cr | violet blue. |
| 24 | N-(3-hydroxy-4-amino-6-chloro-phenylsul-phonyl)-N'-ethylurea. | 5:8-dichloro-1-naphthol. | Cr | blue. |
| 25 | N-(3-amino-4-hydroxy-phenyl-sulphonyl)-N'-ethylurea. | 2-acetylamino-7-naphthol. | Co | Bordeaux red. |
| 26 | ----do---- | ----do---- | Cr | reddish-violet. |
| 27 | ----do---- | 7-hydroxy-2-naphthyl-methyl-carbamate. | Co | Bordeaux red. |
| 28 | ----do---- | ----do---- | Cr | reddish violet. |
| 29 | ----do---- | 1-acetylamino-7-naphthol. | Cr | bluish grey. |
| 30 | ----do---- | 7-hydroxy-1-naphthyl methyl carbamate. | Co | brownish violet. |
| 31 | ----do---- | 1-ureido-7-naphthol. | Cr | greenish grey. |
| 32 | ----do---- | ----do---- | Co | greyish violet. |
| 33 | ----do---- | 1-phenylureido-7-naphthol. | Cr | greenish grey. |
| 34 | ----do---- | 1-thioureido-7-naphthol. | Co | blue grey. |
| 35 | ----do---- | 2-naphthylamine. | Co | reddish grey. |
| 36 | ----do---- | cyclohexylamide of β-hydroxynaphthoic acid. | Co | Bordeaux. |
| 37 | ----do---- | ----do---- | Cr | reddish violet. |
| 38 | ----do---- | diethylamide of β-hydroxynaphthoic acid. | Co | Bordeaux. |
| 39 | ----do---- | ----do---- | Cr | reddish violet. |

The following table gives other examples of mixed complexes, capable of being prepared according to the methods described in Examples 8 and 9. The dyestuffs A and B are the components of the mixed complex. The shades mentioned are those obtained on wool from a neutral or weakly acid bath with these mixed complexes.

| | Dyestuffs A | Dyestuffs B | Complexing metal | Shade on wool |
|---|---|---|---|---|
| 40 | N-(3-amino-4-hydroxy-phenyl-sulphonyl)-N'-ethylurea ⟶ 1-acetylamino-7-naphthol. | N-(3-amino-4-hydroxy-phenyl-sulphonyl)-N'-ethylurea ⟶ o-chloro-N-aceto-acetanilide. | Co | yellowish brown. |
| 41 | N-(3-amino-4-hydroxy-phenyl-sulphonyl)-N'-ethylurea ⟶ 1-ureido-7-naphthol. | 2-amino-4-sulphonamido-phenol ⟶ 1-phenyl-3-methyl-5-pyrazolone. | Cr | black brown. |
| 42 | ....do.... | ....do.... | Co | brown. |
| 43 | N-(3-amino-4-hydroxy-phenyl-sulphonyl)-N'-ethylurea ⟶ 1-(4'-chloro-phenyl)-3-methyl-5-pyrazolone. | 2-amido-4-sulphonamido ⟶ 1-ureido-7-naphthol. | Cr | greyish brown. |
| 44 | ....do.... | ....do.... | Co | brown. |
| 45 | N-(3-amino-4-hydroxy-phenyl-sulphonyl)-N'-ethylurea ⟶ 1-ureido-7-naphthol. | 4-nitro-2-amino-phenol ⟶ 1-phenyl-3-methyl-5-pyrazolone. | Cr | Do. |
| 46 | ....do.... | ....do.... | Co | orange brown. |
| 47 | N-(3-amino-4-hydroxy-phenyl-sulphonyl)-N'-ethylurea ⟶ 1-(4'-chloro-phenyl)-3-methyl-5-pyrazolone. | 4-nitro-2-amino-phenol ⟶ 1-ureido-7-naphthol. | Co | brownish khaki. |
| 48 | N-(3-amino-4-hydroxy-phenyl-sulphonyl)-N'-ethylurea ⟶ 7-hydroxy-1-naphthyl methyl carbamate. | 2-amino-4-sulphonamido-phenol ⟶ 1-phenyl-3-methyl-5-pyrazolone. | Cr | violet brown. |
| 49 | ....do.... | ....do.... | Co | brown. |
| 50 | ....do.... | 4-nitro-2-amino-phenol ⟶ 1-phenyl-3-methyl-5-pyrazolone. | Cr | greenish brown. |
| 51 | ....do.... | ....do.... | Co | violet brown. |
| 52 | ....do.... | N-(3-amino-4-hydroxy-phenyl-sulphonyl)-N'-ethylurea ⟶ o-chloro-N-aceto-acetanilide. | Co | yellowish brown. |
| 53 | ....do.... | ....do.... | Cr | brown. |
| 54 | ....do.... | N-(3-amino-4-hydroxy-phenyl-sulphonyl)-N'-ethylurea ⟶ 1-(4'-chloro-phenyl)-3-methyl-5-pyrazolone. | Co | reddish brown. |
| 55 | ....do.... | ....do.... | Cr | greyish brown. |
| 56 | N-(3-amino-4-hydroxy-phenyl-sulphonyl)-N'-ethylurea ⟶ 6-bromonaphthol. | 4-nitro-2-amino-phenol ⟶ 1-(3'-sulphon-amido-phenyl)-3-methyl-5-pyrazolone. | Cr | violet brown. |
| 57 | N-(3-amino-4-hydroxy-phenyl-sulphonyl)-N'-ethylurea ⟶ 3-hydroxy-thio-naphthene. | ....do.... | Cr | Do. |
| 58 | ....do.... | N-(3-amino-4-hydroxy-phenyl-sulphonyl)-N'-ethylurea ⟶ 1-(4'-chloro-phenyl)-3-methyl-5-pyrazolone. | Cr | red brown. |

We claim:
1. Monoazo dyestuffs of the general formula:

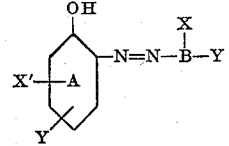

in which B represents a member selected from the group consisting of the benzene, naphthalene and pyrazole residues, X represents a member selected from the group consisting of the hydroxy and amino groups, X' represents a member selected from the group consisting of the hydrogen atom and non-ionic groups, one Y represents a hydrogen atom and the other Y represents a ureosulphonyl group of the formula:

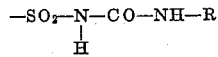

in which R represents a member selected from the group consisting of the hydrogen atom and hydrocarbon groups with one to six carbon atoms.

2. Metalliferous complexes of the monoazo dyestuffs of the general formula given in claim 1 in which the metal of the complex is cobalt.

3. Metalliferous complexes of monoazo dyestuffs of the general formula given in claim 1 in which the metal of the complex is chromium.

References Cited in the file of this patent
UNITED STATES PATENTS

| | | |
|---|---|---|
| 2,371,178 | Martin et al. | Mar. 13, 1945 |
| 2,816,101 | Brieg et al. | Dec. 10, 1957 |